United States Patent Office 3,299,016
Patented Jan. 17, 1967

3,299,016
POLYMERS OF 1-MONOOLEFINS AND AN ALKENYL ACETYLENE AND PROCESS FOR PREPARING SAME
Richard J. Sonnenfeld, Bartlesville, Okla., assignor to Phillips Petroleum Company, a corporation of Delaware
No Drawing. Filed Sept. 3, 1963, Ser. No. 306,341
6 Claims. (Cl. 260—80.5)

This invention relates to a process for copolymerizing 1-monoolefins with a monomer which imparts unsaturation to the resulting polymer, and to the polymers so produced. In another aspect, it relates to a process for copolymerizing ethylene, at least one other 1-monoolefin such as propylene, and a monomer which imparts unsaturation to the resulting polymer and renders the same sulfur-vulcanizable. In another aspect, it relates to novel copolymers of 1-monoolefins and monomers which impart unsaturation to the copolymers.

Many 1-monoolefins, such as ethylene and propylene, are inexpensive polymerizable monomers which are commercially available in great volumes. Such monomers can be polymerized to form polymers ranging from low molecular weight oils to high molecular weight solids. The curing or vulcanization of many of these polymers cannot be conveniently carried out in the conventional manner, for example by vulcanization with sulfur as in the case of butadiene/styrene polymers, because of the lack of ethylenic unsaturation in the polymer. Vulcanization of these polymers, such as an ethylene/propylene copolymer, requires the use of expensive high energy radiation or organic peroxides, or requires pretreatment such as chlorosulfonation or chlorination of the polymer in order to render it suitable for curing. Such process limitations detract from the gains to be had by the unique properties possessed by the polymers, especially ethylene/propylene copolymers which are high molecular weight rubber-like substances having a high degree of resistance to weathering, sunlight and ozone.

A number of processes have been proposed for chemically modifying polymers of 1-monoolefins, particularly ethylene/propylene copolymers, in order to impart some degree of unsaturation to the copolymers and make it possible to cure them with sulfur. Such modification can be achieved by incorporating a different copolymerizable monomer, such as an open-chain diolefin, but in general such modifications have not produced the polymer in good yields and have, for example, in the case of a dicyclopentadiene, required large amounts of the additional monomer to impart sufficient unsaturation and require long periods for the polymer to cure.

Accordingly, an object of this invention is to provide an improved process for the copolymerization of 1-monoolefins. Another object is to provide improved polymers of 1-monoolefins, which polymers can be cured with sulfur. Another object is to provide an improved process for chemically modifying an ethylene/propylene copolymer so as to impart some degree of unsaturation thereto and make it amenable to vulcanization with sulfur. Further objects and advantages of this invention will become apparent to those skilled in the art from the following description and accompanying claims.

Briefly, the improved process of this invention comprises copolymerizing ethylene, or ethylene and at least one other 1-monoolefin such as propylene, with an ethynyl ethylene, and recovering the resulting novel polymer from the polymerization reaction mixture. Such polymerization can be carried out with any polymerization coordination catalyst known in the art, which catalyst generally comprises that obtained upon commingling a reducible metal compound, such as vanadium tetrachloride or vanadium oxytrichloride, with a reducing compound of a metal, usually aluminum, such as ethylaluminum sesquichloride. The novel polymers produced by this invention have some degree of unsaturation and can range from crystalline or plastic materials to elastomeric materials, and they can be vulcanized with sulfur to produce polymeric products which have useful properties that make them widely applicable.

The ethynyl ethylenes employed as novel comonomers with 1-monoolefins, according to this invention, can be represented by the general formula

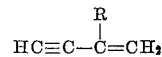

where R is hydrogen or an inert hydrocarbon radical, such as an alkyl, cycloalkyl, or aryl radical (preferably a lower alkyl), or combinations of such radicals, such as alkaryl, aralkyl, arylcycloalkyl, cycloalkylalkyl, alkylcycloalkyl, cycloalkylaryl, and the like, the number of carbon atoms in R generally being from 1 to 20. Representative ethynyl ethylenes which can be used as comonomers in the copolymerization of 1-monoolefins include:

1-buten-3-yne (vinylacetylene),
2-methyl-1-buten-3-yne (isopropenylacetylene),
2-ethyl-1-buten-3-yne,
2-n-propyl-1-buten-3-yne,
2-isobutyl-1-buten-3-yne,
2-n-amyl-1-buten-3-yne,
2-n-decyl-1-buten-3yne,
2-(5-methyldecyl)-1-buten-3-yne,
2-n-pentadecyl-1-buten-3-yne,
2-(9,10-diethylhexadecyl)-1-buten-3-yne,
2-(4-methyl-9-ethylheptadecyl)-1-buten-3-yne,
2-(n-octadecyl)-1-buten-3-yne,
2-(3,6-dipentyl)decyl-1-buten-3-yne,
2-n-eicosyl-1-buten-3-yne,
2-cyclopentyl-1-buten-3-yne,
2-cyclohexyl-1-buten-3-yne,
2-(3-ethylcyclopentyl)-1-buten 3-yne,
2-(2-cyclohexylethyl)-1-buten-3-yne,
2-[3(3-methylcyclohexyl)propyl]-1-buten-3-yne,
2-(14-cyclohexyltetradecyl)-1-buten-3-yne,
2-phenyl-1-buten-3-yne,
2-(4-tolyl)-1-buten-3-yne,
2-[10(3-n-butylphenyl)decyl]-1-buten-3-yne,
2-benzyl-1-buten-3-yne,
2-(4,6-diphenyl)octyl-1-buten-3-yne,
2-(4-n-amylbenzyl)-1-buten-3-yne,
2-(4-cyclopentylphenyl)-1-buten-3-yne,
2-[3(3-methylcyclohexylphenyl)hexyl]-1-buten-3-yne, and the like, including mixtures thereof.

The 1-monoolefins which are copolymerized with ethylene and any one of the above-mentioned ethynyl ethylenes can be represented by the general formula $CH_2=CHR'$, where R' is an alkyl radical having 1 to 6 carbon atoms. Representative 1-monoolefins which can be used as comonomers with any one of the above-mentioned ethynyl ethylenes include propylene, 1-butene, 1-pentene, 1-hexene, 1-octene, 3-methyl-1-butene, 3-methyl-1-pentene, 3-methyl-1-hexene, 4-ethyl-1-hexene, 4,4-dimethyl-1-pentene, 3,3-dimethyl-1-butene, 5-methyl-1-hexene, 4-methyl-1-heptene, 5-methyl-1-heptene, 4,4-dimethyl-1-hexene, 6-methyl-1-heptene, 3,4,4-trimethyl-1-pentene, and the like, including mixtures of two, three or more thereof.

The relative percentages of the polymers of this invention attributable to each of the monomers employed can vary widely, with the minimum amount of the ethynyl ethylene comonomer being that sufficient to impart sulfur-curability to the polymer. Generally, the ethynyl ethylene comonomer will make up from 0.5 to 20 weight percent, preferably from 1 to 10 weight percent, of the copolymer. Where ethylene is the sole 1-monoolefin employed with an ethynyl ethylene, the former will usually make up 80 to 99.5 weight percent of the copolymer. In the case where an ethynyl ethylene and ethylene are copolymerized with one or more additional 1-monoolefins as comonomers, the copolymer comprises 20–75 weight percent ethylene, 20–75 weight percent of the additional 1-monoolefins, and 0.5–20 weight percent of an ethynyl ethylene, and preferably with the total weight percent of the additional 1-monoolefins being at least 20 weight percent of the copolymer and not exceeding 15 weight percent of the ethynyl ethylene in the copolymer. For most purposes of polymer utility it is preferred that the toluene insoluble content of the polymer, if any, be below 50 weight percent, more preferably below 25 weight percent, of the polymer.

Any of the polymerization coordination catalysts known in the prior art can be employed in the polymerization process of this invention, such catalysts comprising (1) at least one compound of a reducible polyvalent transition metal of Groups IV–A, V–A, VI–A, VII–A, VIII of the Periodic Table (e.g., titanium, vanadium, chromium, manganese, iron, cobalt, and nickel), said reducible compound being a halide, oxyhalide, alcoholate, or acetylacetonate, and (2) at least one reducing compound of a metal of Groups I, II, III, IV–B, and V–B of the Periodic Table (e.g., lithium, sodium, potassium, rubidium, cesium, beryllium, magnesium, calcium, strontium, barium, copper, zinc, cadmium, mercury, aluminum, tin, and antimony), which is preferably above hydrogen in the electromotive series, said reducing compound being an organometal compound, a metal hydride, an organometal hydride or an organometal halogen compound. (The Periodic Table referred to herein and in the claims is shown on pages 448–449 of the Handbook of Chemistry & Physics, 34th Edition, published by Chemical Rubber Publishing Co., Cleveland, Ohio.) Preferably, the metal of the reducible compound is vanadium, titanium or chromium, with vanadium trichloride, vanadium tetrachloride, vanadium oxytrichloride, vanadium oxydichloride, vanadium acetylacetonate, vanadyl acetylacetonate, titanium tetrachloride, tetrabutyl titanate, tetraisopropyl titanate, chromic chloride, chromium acetylacetonate, and chromyl acetylacetonate being examples of preferred reducible components of the coordination catalyst. Preferably, the reducing compound has the general formula $R_nMX_m$ where R is a saturated aliphatic, cycloaliphatic, or aromatic hydrocarbon radical having from 1 to 20 carbon atoms, M is a metal selected from the group consisting of lithium, sodium, potassium, magnesium, calcium, zinc, mercury, aluminum, and tin, X is a halogen selected from the group consisting of chlorine, bromine, and iodine, $n$ is a number from 1 to 4, $m$ is a number from 0 to 2, and $n+m$ is equal to the valence of metal M. The mole ratio of the reducing compound to the reducible compound in the catalyst system can vary widely, and generally this ratio will be in the range of 1/1 to 20/1. The total catalyst level in the reaction system can also vary widely, and generally will be 0.001 to 10 percent by weight of the total monomers, or as expressed in terms of the amount of reducible compound, the catalyst level can be in the range of 0.25 to 40 millimoles (mmoles) per 100 grams of the total monoolefin charged to the reaction system. The catalyst can be premixed, i.e., the catalyst components can be admixed prior to charging to the reaction system, or the catalyst can be prepared in situ in the reaction system. These components or the premixed catalyst can be charged to the reaction system as solutions in solvents like those employed as reaction diluents for the monomers and polymer.

Representative reducible transition metal compounds which can be used in making up the coordination catalysts used in preparing the polymers of this invention include: titanium tetrachloride, titanium tetrabromide, titanium oxydichloride, tetraisopropyl titanate, titanium trichloride, tetra-n-butyl titanate, tetra-2-ethylbutyl titanate, vanadium trichloride, vanadium tetrachloride, vanadium oxytrichloride, vanadium acetylacetonate, vanadyl acetylacetonate, tetra-n-butyl vanadate, tetraethyl vanadate, trimethyl orthovanadate, vanadium oxydichloride, vanadium dichloride, 2-ethylhexyl vanadate, vanadium dibromide, vanadium pentoxide, chromyl chloride, chromium acetylacetonate, chromyl acetylacetonate, chromium chloride, cobaltous chloride, manganese bromide, cuprous chloride, ferric bromide, molybdenum chloride, nickel chloride, and the like, including mixtures thereof.

Representative reducing compounds which can be commingled with any one of the above-named transition metal compounds to prepare the coordination catalyst used in this invention include: ethylaluminum sesquichloride, ethylaluminum sesquiiodide, n-butylaluminum sesquibromide, isopropylaluminum sesquichloride, n-hexylaluminum sesquichloride, n-decylaluminum sesquiiodide, trihexylaluminum, triethylaluminum, diethylaluminum chloride, ethylaluminum dichloride, diisobutylaluminum butoxide, triisobutylaluminum, aluminum hydride, isobutylaluminum dichloride, isobutylaluminum dibutoxide, n-butylaluminum dichloride, n-butyllithium, sodium naphthalene, diisobutylzinc, lithium aluminum tetra-n-decyl, lithium aluminum tetra-n-octyl, amylpotassium, tetraphenyltin, diethyltin diiodide, n-butylmagnesium bromide, diphenylcalcium, di-tert-butylzinc, diethylmercury, and the like, including mixtures thereof.

Representative of the coordination catalysts which can be used in this invention are those obtained upon commingling vanadium tetrachloride and ethylaluminum sesquichloride, vanadium trichloride and ethylaluminum sesquibromide, vanadium oxytrichloride and n-butylaluminum sesquibromide, vanadium oxydichloride and isopropylaluminum sesquichloride, vanadium acetylacetonate and n-hexylaluminum sesquichloride, vanadium oxydichloride and diisobutylaluminum butoxide, vanadium oxytrichloride and triisobutylaluminum, vanadium oxytrichloride and aluminum hydride, vanadium dichloride and triisobutylaluminum, vanadium trichloride and isobutylaluminum dichloride, vanadium tetrachloride and isobutylaluminum dibutoxide, vanadium tetrachloride and triisobutylaluminum, vanadium tetrachloride and aluminum hydride, 2-ethylhexyl vanadate and triisobutylaluminum, titanyl dichloride and isobutylaluminum dichloride, titanium tetrachloride and isobutylaluminum dichloride, titanium tetrachloride and lithium aluminum hydride or didodecyldichloride, titanium tetrachloride and n-decylaluminum sesquiiodide, titanium tetrachloride and sodium naphthalene, tetraisopropyl titanate and triisobutylaluminum, tetraisopropyl titanate and sodium naphthalene, cobaltous chloride and triisobutylaluminum, cobalt bromide or chloride and triisobutylaluminum, manganese bromide and triisobutylaluminum, manganese bromide and diisobutylzinc, chromium chloride and triisobutylaluminum, chromium acetylacetonate and n-heptylaluminum sesquichloride, cuprous chloride and triisobutylaluminum, ferric bromide and triisobutylaluminum, molybdenum chloride and triisobutylaluminum, nickel chloride and triisobutylaluminum, vanadium oxytrichloride and diethylaluminum chloride, vanadium tetrachloride and ethylaluminum dichloride, vanadium oxydiacetylacetonate and triethylaluminum, trimethyl orthovanadate and trihexylaluminum, vanadium tetrachloride and trihexylaluminum, vanadium oxytrichloride and butyllithium, vanadium triacetylacetonate and diethylaluminum chloride, titanium tetrachloride and trihexylaluminum, vanadium trichloride and trihexylaluminum, titanium trichloride and trihexylaluminum, titanium dichloride and trihexylaluminum, vanadium trichloride and n-butyllithium, vanadium tetrachloride and amylpotassium, vanadium oxytrichloride and sodium naphthalene, vanadium oxydichloride and diethylmagnesium, vanadium acetylacetonate and butylmagnesium bromide, vanadyl acetylacetonate and diphenylcalcium, chromic chloride and di-tert-butylzinc, chromium acetylacetonate and diethylmercury, chromyl acetylacetonate and tetraphenyltin, titanium tetrachloride and diethyltin diiodide, tetra-n-butyl titanate and diethylmagnesium, and the like.

The polymerization reaction of this invention is carried out in the absence of oxygen, carbon dioxide and water and in a liquid phase system using a solvent, which will usually be a hydrocarbon or a halogenated hydrocarbon, such as propane, butane, pentane, hexane, benzene, toluene, xylene, tetrachloroethylene, cyclohexane, methylcyclohexane, chlorobenzene, o-dichlorobenzene, dichloromethane, 1,1,2,2-tetrachloroethane, and the like. The polymer will be soluble in the solvent and usually will be present in a concentration of 1 to 15 weight percent. The polymerization conditions can vary widely, but generally the polymerization temperature will be in the range of −80 to 150° C. and the reaction pressure will be that sufficient to maintain the reaction mixture in the liquid phase and can be up to 500 or more atmospheres. Polymerization can be carried out in a batch manner or a continuous fashion, much like the polymerization processes of the prior art. Following polymerization, the polymer product can be conventionally recovered from the effluent by coagulation with a non-solvent such as an alcohol like isopropyl alcohol or n-butyl alcohol, acetone, or the polymer can be recovered by stripping the solvent with heat or steam. An antioxidant can be incorporated in the polymer during the recovery procedure, such as phenyl-beta-naphthylamine, di-tert-butylhydroquinone, triphenylphosphite, heptylated diphenylamine, 2,2'-methylene-bis(4 - methyl - 6 - tert-butylphenol), and 2,2,4-trimethyl-6-phenyl-1,2-dihydroquinoline.

The vulcanization or curing of the novel polymers of this invention can be carried out using conventional sulfur vulcanization procedures (e.g., 250–400° F., for 5–120 minutes), the amount of sulfur employed generally being from 0.1 to 5 parts per 100 parts of polymer (phr.) and usually about 0.5 to 3 phr. The polymers can also be cured with compounds which can decompose to form free radicals such as peroxide (e.g., 0.1 to 10 phr.) like diisopropyl peroxide, di-tert-butyl peroxide, dibenzoyl peroxide, tert-butyl perbenzoate, etc. The polymers can also be cured with combinations of peroxide and sulfur, e.g., with peroxide/sulfur weight ratio of 0.1/1 to 4/1. Vulcanization accelerators, accelerator activators, reinforcing agents, extenders, plasticizers, antioxidants and fillers, like those agents used in compounding natural and synthetic rubber, can also be employed. Fillers and reinforcing agents such as carbon black, clay, calcium silicate, talc, silica, whiting, and titanium dioxide, and plasticizers such as naphthenic and paraffinic oils, can be used in compounding the polymers of this invention. Such polymers will have molecular weights in the range of about 5000 to 1,000,000, and can be used in fabricating such rubber goods and plastic products as coatings for electrical cables, window-seals, garden hose, soles and heels, belts, coated fabrics, tires, films, coatings, containers (bottles), pipes, fibers, etc.

The objects and advantages of this invention are illustrated in the following examples, but it should be understood that the various materials used in these examples, the conditions of operation, and other details, should not be construed to unduly limit this invention.

*Example I*

Copolymers of ethylene, propylene and isopropenylacetylene were prepared in a series of runs employing toluene or cyclohexane as a reaction diluent and using as a polymerization coordination catalyst ethylaluminum sesquichloride commingled with either vanadium tetrachloride or vanadium oxytrichloride. In preparation of said polymers, a 3/1 volume mixture of propylene and ethylene was made up by charging propylene to an evacuated bomb until the pressure reached 30 p.s.i.g., and then charging ethylene until the total pressure was 45 p.s.i.g. The procedure used in each of the continuous polymerization runs was to charge the diluent (100 ml.) to the polymerization reactor first and then purge the reactor with nitrogen. Isopropenylacetylene was then added to the reactor, followed by the ethylaluminum sesquichloride. The ethylene/propylene mixture was then introduced from the bomb reservoir, raising the pressure in the polymerization reactor to about 45 p.s.i.g. Charging of the reactor was done at room temperature. The polymerization reaction mixture was agitated for 5 min., after which polymerization was initiated by introducing the vanadium component of the catalyst. Then additional ethylene/propylene mixture was passed to the reactor from its reservoir to maintain a constant pressure as polymerization continued. The temperature of polymerization increased due to the exothermic reaction. Table I sets forth charged materials used in the runs.

TABLE I

| Run | Diluent | Ethylaluminum sequichloride, mmoles | Vanadium tetra. chloride, mmoles | Vanadium oxytrichloride, mmoles | Isopropenyl-acetylene, mmoles |
|---|---|---|---|---|---|
| 1 | Toluene | 0.25 | 0.1 | 0 | 2.5 |
| 2 | do | 0.25 | 0.1 | 0 | 5.0 |
| 3 | Cyclohexane | 0.25 | 0.1 | 0 | 2.5 |
| 4 | do | 0.25 | 0 | 0.1 | 2.5 |
| 5 | Toluene | 0.25 | 0 | 0.1 | 2.5 |

After a 30-min. polymerization period, the reaction of each run was terminated (shortstopped) with an isopropyl alcohol solution of 2,2'-methylene-bis(4-methyl-6-tert-butylphenol) antioxidant, the amount of antioxidant used being one phr. The ethylene/propylene/isopropenylacetylene polymer was coagulated in isopropyl alcohol, separated and dried. Certain properties of the polymers from the runs were determined and these are set forth in Table II, the number of the "polymer sample" in the latter table corresponding to the number of the "run" of Table I.

TABLE II

| Polymer sample | Amt. of polymer, gm. | Total unsaturation,[a] mmoles ICl/gm. polymer | Amt. of propylene in polymer,[b] wt. percent | Inherent viscosity | Toluene insolubles,[c] wt. percent |
|---|---|---|---|---|---|
| 1 | 2.3 | 0.30 | 41 | 1.27 | Trace. |
| 2 | 1.4 | 0.36 | 34 | 1.14 | 31 |
| 3 | 1.5 | 0.27 | 38 | 1.36 | 9 |
| 4 | 1.8 | 0.20 |  | 1.16 | 32 |
| 5 | 2.0 | 0.29 | 37 | 1.13 | 20 |

[a] Determined by iodine chloride titration.
[b] Determined by infrared analysis.
[c] Portion insoluble in toluene after 24 hrs. at room temperature.

Infrared analysis indicated the presence of isopropenyl groups along the polymer chain. Based on the data of Table II, the compositions of the polymers from runs 1 to 3 and 5 were calculated and these are set forth in Table III. In calculating the wt. percent of isopropenylacetylene, it was assumed that each molecule incorporated into the polymer chain furnished two double bonds.

TABLE III

| Polymer Sample | Amt. of propylene, wt. percent | Amt. of ethylene, wt. percent | Amt. of isopropenylacetylene, wt. percent |
|---|---|---|---|
| 1 | 41.0 | 58.0 | 1.0 |
| 2 | 34.0 | 64.8 | 1.2 |
| 3 | 38.0 | 61.1 | 0.9 |
| 5 | 37.0 | 62.1 | 0.9 |

*Example II*

A blend of ethylene/propylene/isopropenylacetylene copolymers prepared in two runs according to this invention was compounded, cured, and the physical properties of the cured polymer product determined. In preparing the polymer of each run, 600 ml. of toluene was first charged to a polymerization reactor, followed by 50 gm. of propylene and 1.5 mmoles of ethylaluminum sesquichloride. The reactor was pressured to 40 p.s.i.g. with ethylene, agitated for 10 min., and charged with isopropenylacetylene and one mmole of vanadium tetrachloride. The reactor pressure was maintained at 40 p.s.i.g. throughout the run, which was carried out for 1 hr. at 80° F. The amount of isopropenylacetylene used in preparing "polymer sample No. 1" was 22.5 mmoles, and the amount used in preparing "polymer sample No. 2" was 25 mmoles. Each of the polymerization reactions was shortstopped, and the polymer was recovered, and evaluated. These polymer properties are set forth in Table IV.

TABLE IV

| | Polymer sample No. 1 | Polymer sample No. 2 |
|---|---|---|
| Amt. of propylene in polymer, wt. percent | 44 | 44 |
| Inherent viscosity | 1.50 | 1.59 |
| Amt. toluene insolubles, wt. percent | 0 | 3 |
| Total unsaturation, mmoles ICl/gm. polymer | 0.21 | 0.22 |

The polymer products from the two runs were then combined and blended, and the blended material (having a Mooney viscosity ML-4 of 82 at 212° F.) was compounder using the compounding recipe of Table V.

TABLE V

| | Parts by weight |
|---|---|
| Polymer blend | 100 |
| High abrasion furnace black | 50 |
| Zinc oxide | 5 |
| Stearic acid | 1 |
| Circosol 2XH [1] | 30 |
| Sulfur | 1.5 |
| Captax [2] | 0.5 |
| Monex [3] | 1.5 |

[1] Petroleum hydrocarbon softener, containing hydrocarbons of high molecular weight, in the form of a heavy, viscous, transparent, pale green, odorless liquid of low volatility; specific gravity, 0.940; Saybolt Universal viscosity at 100° F., about 2000 seconds.
[2] 2-mercaptobenzothiazole.
[3] Tetramethylthiuram monosulfide.

The compounded blend was then cured for 45 min. at 320° F., and the properties of the cured product were then determined, the results being set forth in Table VI.

TABLE VI

| | |
|---|---|
| 300% modulus, p.s.i. | 360 |
| Tensile, p.s.i. | 2020 |
| Elongation, percent | 875 |
| Resilience, percent | 65.3 |
| Shore A hardness | 58.0 |
| Gehrman freeze point, ° C. | 56 |

*Example III*

In this example, a copolymer of ethylene/propylene/vinylacetylene was prepared according to this invention by a continuous process. In this process, two makeup tanks or reservoirs were used and their contents were introduced simultaneously into a 1-liter autoclave at rates such that completion of addition of materials from both makeup tanks occurred at the same time. One of the composite streams ("makeup tank No. 1") consisted of toluene, ethylene, and vanadium tetrachloride and the other stream ("makeup tank No. 2") consisted of toluene, propylene, vinylacetylene and ethylaluminum sesquichloride. Compositions of the makeup tanks from which these streams were withdrawn are set forth in Table VII.

TABLE VII

| | Makeup Tank No. 1 | Makeup Tank No. 2 |
|---|---|---|
| Toluene, ml. | 1,600 | 1,600 |
| Ethylene, gm. | 80 | 0 |
| Propylene, gm. | 0 | 200 |
| Vinylacetylene, mmoles | 0 | 160 |
| Vanadium tetrachloride, mmoles | 4 | 0 |
| Ethylaluminum sesquichloride, mmoles | 0 | 10 |

At the beginning of the run, 500 ml. of toluene was charged to the polymerization reactor, which had previously been filled with nitrogen. The reactor was then pressured with nitrogen to 180 p.s.i.g. The two streams were pumped into the reactor at the same time and the entire contents from the two makeup tanks were added to the reactor. Throughout the run, 500 ml. of material was maintained in the reactor by regulating the rate of withdrawal of effluent. The time required to pump out the contents of the makeup tank was 47 min., and the total reaction time was 52 min. Unreacted ethylene and propylene were flashed from the reactor effluent, after which 2 wt. percent of 2,2'-methylene-bis(4-methyl-6-tert-butylphenol) antioxidant was added. The rubbery polymer was then coagulated with isopropyl alcohol, separated and dried; the polymer recovered weighed 58 gm. The properties of the polymer are set forth in Table VIII.

TABLE VIII

| | |
|---|---|
| Amt. of propylene, wt. percent | 33 |
| Total unsaturation, mmoles ICl/gm. polymer | 0.33 |
| Inherent viscosity | 1.04 |
| Toluene insolubles, wt. percent | 47 |

The ethylene/propylene/vinylacetylene copolymer obtained from the continuous run was then compounded using the recipe of Table V, except that only 20 parts by weight of Circosol 2XH was used. The compounded polymer was then cured at 320° F., and properties at 30 min. and 45 min. cure times are set forth in Table IX.

TABLE IX

| | Cure time, min. | |
|---|---|---|
| | 30 | 45 |
| 300% modulus, p.s.i. | 1,350 | 1,580 |
| Tensile, p.s.i. | 2,505 | 2,850 |
| Elongation, percent | 535 | 505 |
| Resilience, percent | 62.5 | 61.8 |
| Shore A hardness | 86.5 | 88 |

*Example IV*

For purposes of comparison, a copolymer of ethylene/propylene/acetylene was prepared using the continuous polymerization process procedure of Example III. The compositions of the two makeup tanks in this comparison or control run were the same as that of Table VII except that 24 mmoles of vanadium tetrachloride, 60 mmoles of ethylaluminum sesquichloride and 120 mmoles of acetylene (instead of vinylacetylene) were used. The total pump time for the comparison run was 45 min., the total reaction time was 50 min., and the weight of the polymer obtained was 48.2 gm. The properties of this polymer are set forth in Table X.

TABLE X

| | |
|---|---|
| Amt. of propylene, wt. percent | 23 |
| Total unsaturation, mmoles ICl/gm. polymer | 0.47 |
| Inherent viscosity | 0.22 |
| Toluene insolubles, wt. percent | 43 |

In comparing the preparation of this control polymer with that of Example III, note that the catalyst level used in the comparison run was higher. Such high catalyst level was necessary in order to initiate the polymerization reaction, since no ethylene/propylene/acetylene polymer was obtained at the catalyst levels employed in Example III. Note also that the control polymer had a vary low inherent viscosity as compared to that polymer of Example III, indicating that the control polymer would be unsuitable for many applications, such as in tires. Furthermore, when an attempt was made to cure this control polymer, using the recipe of Table V (with the omission of the plasticizer, Circosol 2XH), a cure was not obtained, notwithstanding the unsaturation of the control polymer.

*Example V*

In this example, a copolymer of ethylene and vinylacteylene was prepared using the recipe of Table XI.

TABLE XI

| | |
|---|---|
| Cyclohexane, ml. | 500 |
| Diethylaluminum chloride, mmoles | 5.0 |
| Vanadium oxytrichloride, mmoles | 1.0 |
| Vinylacetylene, mmoles | 45 |
| Ethylene, p.s.i.g. over reactor pressure | 70 |

The reactor used to prepare the ethylene/vinylacetylene copolymer was first purged with hydrogen and 350 ml. of cyclohexane was then charged. Diethylaluminum chloride was added followed by 50 ml. of cyclohexane, the vinylacetylene, another 50 ml. of cyclohexane, the vanadium oxytrichloride, and then 50 more ml. of cyclohexane. Ethylene was then added until the pressure reached 70 p.s.i.g. over reactor pressure. Polymerization was continued for one hour during which time ethylene was introduced to maintain the pressure at 70 p.s.i.g. over reactor pressure. Temperature was maintained at 80° F. throughout the run. The reaction was terminated and the polymer recovered as in the Example I. It had a total unsaturation of 0.14 mmole ICl/gm. polymer. Infrared examination gave evidence of a conjugated system of double bonds but no —C≡C—.

In the foregoing examples, the procedure used to determine total unsaturation by iodine chloride titration was as follows: A 0.5-gram sample of polymer was dissolved in a 75/25 volume mixture of carbon disulfide and chloroform, a chloroform solution of iodine chloride of known concentration (approximately 0.09–0.10 molar) was added, the mixture was placed in a 25° C. bath for one hour to allow time for reaction, and the excess of iodine chloride was titrated with 0.05 N sodium thiosulfate. The millimoles of iodine chloride that reacted with one gram of sample was then calculated. A blank was run using only solvent and iodine chloride and appropriate correction was made when calculating unsaturation.

In the examples, an infrared procedure was used to determine the wt. percent propylene. A carbon tetrachloride solution of the polymer containing one gram of polymer per 100 milliliters solvent was used. The solution was placed in a 1500-micron cell and scanned for a peak at the 7.25 micron band using a commercial infrared spectrophotometer. The number of methyl groups (N) was obtained from the formula:

$$N = \frac{(14{,}000)(A_{7.25})(1{,}000)}{(C)(t)(\epsilon)} \quad (I)$$

14,000 = molecular weight of 1,000 methylene groups
$A_{7.25}$ = absorbance at the 7.25 micron band
$C$ = concentration of polymer solution in gram/liter
$t$ = cell thickness in centimeters
$\epsilon$ = specific extinction coefficient The specific extinction coefficient ($\epsilon = 28{,}700$) was determined using three samples of an ethylene/propylene copolymer of known propylene content as a reference material. The value was obtained by solving the equation $$\epsilon = \frac{(14{,}000)(A_{7.25})}{(d)(t)(N)} \quad (II)$$

$d$ = density of polymer solution in gm./cc. (assumed to be 0.9)
$t$ = thickness of aborbing layer of polymer in centimeters
$N$ = number of methyl branches in control polymer The percent propylene was calculated as follows:

$$\text{Percent} = \frac{(N)(100)}{333} \quad (III)$$

In the Formula III, 333 is the number of methyl branches per 1,000 methylene groups.

The inherent viscosities referred to in the examples were determined by placing one-tenth gram of polymer in a wire cage made from 80 mesh screen and placing the wire cage in 100 ml. of toluene contained in a widemouth, 4-ounce bottle. After standing at room temperature (approximately 25° C.) for 24 hours, the cage was removed and the solution was filtered through a sulfur absorption tube of grade C porosity to remove any solid particles present. The resulting solution was run through a Medalia-type viscometer supported in a 25° C. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.

The amount of toluene insolubles referred to in the examples is that amount of material not dissolved after 0.2 gram sample of the polymer remains in contact with 100 milliliters of toluene at room temperature for 24 hours. The value should be below 50 weight percent for a rubbery polymer. Ordinarily, it is preferred to have the value below 25 weight percent, but for some uses (mechanical goods, mats, shoe soles, etc.) it can be higher. For uses where high resilience and low heat build-up are important, it is desirable to have the toluene insolubles low.

Various modifications and alterations of this invention will become apparent without departing from the scope and spirit of this invention and it should be understood that this invention is not to be limited unduly to that set forth herein for illustrative purposes.

I claim:

1. An unsaturated rubbery terpolymer consisting essentially of ethylene, at least one other 1-monoolefin, and an ethynyl ethylene.

2. An unsaturated rubbery terpolymer consisting essentially of 20–75 weight percent ethylene, 20–75 weight percent propylene and 0.5 to 20 weight percent vinylacetylene.

3. An unsaturated rubbery terpolymer consisting essentially of 20–75 weight percent ethylene, 20–75 weight percent propylene and 0.5 to 20 weight percent isopropenylacetylene.

4. A process comprising contacting ethylene and vinylacetylene at a temperature ranging from −80 to 150° C. and a pressure ranging from 1 to 500 atmospheres in cyclohexane with a coordination catalyst comprising (1) vanadium oxytrichloride and (2) diethylaluminum chloride, said vinylacetylene being present in an amount ranging from 0.5 to 20 weight percent of the resulting copolymer, and recovering the resulting copolymer from the reaction mixture.

5. A process comprising contacting ethylene, propylene, and isopropenylacetylene in toluene or cyclohexane at a temperature ranging from −80 to 150° C. and a pressure ranging from 1 to 500 atmospheres with a coordination catalyst comprising (1) vanadium tetrachloride or vanadium oxytrichloride and (2) ethylaluminum sesquichloride, said isopropenylacetylene being present in an amount ranging from 0.5 to 20 weight percent of the resulting terpolymer, and recovering the resulting terpolymer from the reaction mixture.

6. A process comprising contacting ethylene, propylene, and vinylacetylene in toluene at a temperature ranging from −80 to 150° C. and at a pressure ranging from 1 to 500 atmospheres with a coordination catalyst comprising (1) vanadium tetrachloride and (2) ethylaluminum sesquichloride, said vinylacetylene being present in an amount ranging from 0.5 to 20 weight percent of the resulting terpolymer, and recovering the resulting terpolymer from the reaction mixture.

References Cited by the Examiner

UNITED STATES PATENTS

| | | | |
|---|---|---|---|
| 2,384,731 | 9/1945 | Denoon | 260—88.2 |
| 2,781,408 | 2/1957 | Witt et al. | 260—88.2 |
| 2,898,327 | 8/1959 | McCulloch et al. | 260—88.2 |
| 3,092,613 | 6/1963 | Kennerly et al. | 260—88.2 |

FOREIGN PATENTS 224,036   1/1958   Australia.

JOSEPH L. SCHOFER, *Primary Examiner.*

W. HOOVER, *Assistant Examiner.*